United States Patent [19]

Marcellis et al.

[11] 4,440,577

[45] Apr. 3, 1984

[54] POLYHYDROXY POLYPHENYL COMPOUNDS AS ADDITIVES FOR CEMENTITIOUS MATERIALS

[75] Inventors: Alphonso W. Marcellis, Boonton; Grannis S. Johnson, Plainfield, both of N.J.

[73] Assignee: Diamond Shamrock Corporation, Dallas, Tex.

[21] Appl. No.: 415,018

[22] Filed: Sep. 7, 1982

[51] Int. Cl.$^3$ ............................................. C04B 7/35
[52] U.S. Cl. .................................... 106/90; 106/314
[58] Field of Search ............................. 106/90, 314

[56] References Cited

U.S. PATENT DOCUMENTS

| | | | |
|---|---|---|---|
| 2,141,569 | 12/1938 | Tucker | 106/90 |
| 3,537,869 | 11/1970 | Proell | 106/95 |

OTHER PUBLICATIONS

CA 71 104857s.

*Primary Examiner*—James Poer
*Attorney, Agent, or Firm*—Neal T. Levin

[57] ABSTRACT

A superplasticizer with improved water reducing properties for cement, cement slurries, mortar, grout and concrete is Penacolite Resin RM-441 as is or sulfonated, sulfomethylated, sulfonated and condensed with formaldehyde, sulfomethylated and condensed with formaldehyde, condensed with formaldehyde, co-condensed with ligninsulfonates and formaldehyde or co-condensed with naphthalenesulfonic acid formaldehyde condensate and formaldehyde. These materials can be used alone or in combination with salts of aromatic sulfonic acid formaldehyde condensates.

34 Claims, No Drawings

POLYHYDROXY POLYPHENYL COMPOUNDS AS ADDITIVES FOR CEMENTITIOUS MATERIALS

BACKGROUND OF THE INVENTION

1. Field of Invention

This invention relates to additives which improve the compressive strength and workability of cementitious compositions such as cement, cement slurries, mortar, grout and concrete.

2. Description of the Prior Art

For example, concrete is a hard, strong building material made by mixing cement, sand, gravel and water. Water in the mixture causes the cement to set and bind the entire mixture in a hard mass. It is well known in concrete technology that the strength—usually the compressive strength as measured by the ASTM test C39-72—is a reliable criterion of general quality. For this reason, the whole technology of concrete is developed around obtaining a significant and practical strength with a minimum of cost, and a maximum of convenience in use. Despite extensive research, most of the concrete presently being used are simple mixtures of sand and coarse stone containing a minor proportion of portland cement with sufficient water being added to produce a mixture fluid enough to place in forms.

It is well known in the art that reducing water in cementitious materials such as concrete increases the compressive strength and other properties as well. Considerable research has been directed to discovering mixtures of different particle sizes of sand and stone which will give fluid concrete having minimum water content. Also, various organic and inorganic additives have been found which permit reduction in the water content of concrete. One such additive, the sodium salt of naphthalene sulfonic acid formaldehyde condensate is used commercially for this purpose. This additive also increases the strength of hardened concrete. See U.S. Pat. No. 2,141,569—Tucker—Dec. 27, 1938.

Further, U.S. Pat. No. 3,537,869—Proell—Nov. 3, 1970 describes use of additives containing sulfonated condensation products of formaldehyde and naphthalene or salts thereof in combination with lecithin, partial fatty acid esters of polyols, their ethoxylates, sulfates, etc., in concrete mixes to increase compressive strength of the hardened concrete.

Additionally, use of particular hydroxy aromatic materials in cement and concrete is shown below.

CA 71 104857s discloses effect of pyrocatechol, pyrogallol and condensed and hydrolyzed tannins as accelerators for cement with various results upon acceleration and mechanical strength.

SUMMARY OF THE INVENTION

Penacolite Resin RM-441, a water soluble residue obtained from the manufacture of resorcinol, alone or in admixture with one or more salts of aromatic sulfonic acid formaldehyde condensates, when added to concrete mixes and other cementitious compositions acts to reduce the water required for good workability and results in cementitious compositions such as cement, cement slurries, mortar, grout, and concrete of increased compressive strength. These materials may be added at any point during the preparation of the cementitious material and may be added in liquid or solid form depending on when they are introduced. They are added in effective amounts to reduce the water content and to bring about increased compressive strength of the hardened product. For example, from about 0.1% to about 5.0% by weight of Penacolite Resin RM-441, alone or in admixture with one or more salts of aromatic sulfonic acid formaldehyde condensates, based on the weight of the cement component, may be used. Where salts of aromatic sulfonic acid formaldehyde condensates are present, they can be present in amounts up to about 95% by weight of Penacolite Resin RM-441. Preferably, there is present from about 25% by weight to about 75% by weight of at least one salt of aromatic sulfonic acid formaldehyde condensate and from about 25% by weight to about 75% by weight of Penacolite Resin RM-441.

Copending U.S. application Ser. No. 399,758—Lipowski, filed July 19, 1982 discloses blends of (1) water soluble resorcinol-formaldehyde and catechol-formaldehyde resins and (2) salts of naphthalene and lower alkyl substituted naphthalene sulfonic acid formaldehyde condensates added to concrete mixes and other cementitious materials to reduce water required for good workability and to increase compressive strength.

DESCRIPTION OF THE PREFERRED EMBODIMENTS

Copending U.S. application Ser. No. 367,263—Marcellis et al, filed Apr. 12, 1982, now U.S. Pat. No. 4,391,645, issued July 5, 1983, discloses blends of (1) salts of aromatic sulfonic acid formaldehyde condensates and (2) hydroxy aromatic compounds such as catechol, resorcinol, pyrogallol and gallic acid added to cementitious materials to reduce water and to increase compressive strength.

It was unexpectedly found that a commercially available product from Koppers Company, Inc., known as Penacolite Resin RM-441, acts as a superplasticizer for concrete and other cementitious materials equal in performance to the well known naphthalene sulfonic acid formaldehyde condensates and the sulfonated melamine condensates. This product is composed of bottoms or residue containing polyhydroxy polyphenyl compounds obtained from resorcinol production by the alkaline fusion method. This method involves alkaline fusion of the disodium salt of m-benzenedisulfonic acid. A description of this method can be found in Encyclopedia of Chemical Technology, Kirk-Othmer, Third Edition, Volume 13, pages 48 and 49.

Penacolite Resin RM-441 has the following typical properties:

| Color | Dark redish black |
|---|---|
| Viscosity, Poise (70% Solution at 23° C.) | 4 |
| Specific Gravity | 1.3 |
| Softening Point, °C. | 80–90 |
| Voltiles at 300° C. | 60% (approx.) |
| Flash Point (COC), °C. | 204 |
| Ash | <1% |
| Iron | <0.5% |

It has the following composition:

| Component | % by Wt. |
|---|---|
| Resorcinol | 2–8 |
| Dihydroxy diphenyl | 12–20 |
| Trihydroxy diphenyl | 25–35 |

| -continued |  |
| --- | --- |
| Component | % by Wt. |
| Higher molecular wt. polymers | Balance |

Further, when Penacolite Resin RM-441 is sulfonated, sulfomethylated, sulfonated and condensed with formaldehyde, sulfomethylated and condensed with formaldehyde, condensed with formaldehyde, co-condensed with ligninsulfonates and formaldehyde or co-condensed with aromatic sulfonic acid formaldehyde condensates such as naphthalene sulfonic acid formaldehyde condensate, and formaldehyde to form water soluble products, useful products are obtained which when used alone or in combination with salts of aromatic sulfonic acid formaldehyde condensates are superplasticizers and result in cementitious compositions of increased compressive strength. The proportions previously recited for use of Penacolite Resin RM-441, alone or in admixture with one or more salts of aromatic sulfonic acid formaldehyde condensates for use as additives to cementitious compositions, are applicable to these other materials or derivatives as well when used alone or in admixture with one or more salts of aromatic sulfonic acid formaldehyde condensates.

Penacolite Resin RM-441 can be used as is, or in the form of its sodium, potassium, ammonium, aluminum and zinc salts. Similarly, the derivatives of Penacolite Resin RM-441 described above can be used in the form of their sodium, potassium, ammonium, aluminum and zinc salts or in the acid (phenol) form.

More specifically, Penacolite Resin RM-441 can be sulfonated, sulfomethylated, sulfonated and condensed with formaldehyde, sulfomethylated and condensed with formaldehyde, condensed with formaldehyde, co-condensed with lignosulfonates or co-condensed with aromatic sulfonic acid formaldehyde condensate according to conventional and well-known procedures for conducting these reactions as shown below.

For example, Penacolite Resin RM-441 is sulfonated at 25°-80° C. for 1-5 hours with excess concentrated sulfuric acid. The sulfonated mass is neutralized with caustic and purified. The salt of sulfonated Penacolite Resin RM-441 (80-90% by weight) is acidified and condensed with 5-10% by weight of 37% by weight aqueous solution of formaldehyde to a higher molecular weight, water soluble product as determined by the increased viscosity. Similarly, Penacolite Resin RM-441 itself is condensed with formaldehyde to form higher molecular weight water soluble products.

Penacolite Resin RM-441 is sulfomethylated under alkaline conditions with equal amounts by weight of sodium metabisulfite and 3% by weight aqueous solution of formaldehyde at 50°-100° C. The sulfomethylated derivative, 80-90% by weight, is mixed with 5-10% of 37% by weight aqueous solution of formaldehyde at 50°-100° C. to increased molecular weight water soluble products as determined by the increased viscosity.

Various weight ratios of aromatic sulfonic acid formaldehyde condensate and Penacolite Resin RM-441 are co-condensed with varying amounts of 37% by weight aqueous solution of formaldehyde under alkaline conditions at 50°-100° C. to increased viscosities to form higher molecular weight water soluble products. Similarly, Penacolite Resin RM-441 and ligninsulfonates, are co-condensed with 37% by weight aqueous solution of formaldehyde to form higher molecular weight water soluble products.

Aromatic Sulfonic Acid Formaldehyde Condensate

The commercial superplasticizer, the sodium salt of naphthalene sulfonic acid formaldehyde condensate was found to be the preferred aromatic sulfonic acid formaldehyde condensate effective in the mixture. Although the preferred form of these condensates is their sodium salt, they can be used in the form of other salts such as the calcium, potassium, zinc, aluminum, magnesium, maganese, ferrous, ferric and ammonium salts. Amine salts can be used such as the methylamine, dimethylamine, ethanolamine and diethanolamine salts. These condensates may be prepared by reacting a mixture of naphthalene or other aromatics such as benzene, toluene, xylene, benzoic acid, phthalic acid and phenol with formaldehyde and sulfuric acid. Useful processes are described in U.S. Pat. No. 2,141,569—Tucker et al—Dec. 27, 1938; U.S. Pat. No. 3,193,575—Nebel et al—July 6, 1965 and U.S. Pat. No. 3,277,162—Johnson—Oct. 4, 1966. Other aromatic sulfonic acid formaldehyde condensates which can be used herein in their salt forms are the benzene, toluene, xylene, benzoic acid, phthalic acid and phenol sulfonic acid formaldehyde condensates and copolymers of these with naphthalene.

Naphthalene sulfonic acid formaldehyde condensate is a mixture of condensation products of naphthalenesulfonic acid and formaldehyde. It can be chromatographed by size exclusion chromatography through a column containing pore sizes which selectively separate molecular volumes according to size. The solvent chosen for the acid in chromatography should minimize solute-packing interaction and solute-solute interaction. The chromatogram gives a true molecular volume profile when the eluents are displayed on a detector-strip chart recorder display. The chromatrogram for a sample of the sulfonic acid used in the examples is the same as that for the sodium naphthaleneformaldehyde sulfonate in U.S. Pat. No. 3,954,491—Adrian et al—May 4, 1976, and the two anionic materials are identical. That is, the anionic materials from the acid have the same profile as the anionic materials from the sodium naphthaleneformaldehyde sulfonate having lowest elution volumes of from about 61 to about 70% of the total elution volume and equivalent elution volumes of from about 61 to about 70% of the total eultion volume. The teachings in U.S. Pat. No. 3,954,491 relating to chromatography are incorporated by reference herein. This chromatographic method was described by Dr. Harold Edelstein in a paper entitled, "Aqueous Gel Permeation Chromatograph of Some Naphthalene Sulfonic Acid Formaldehyde Condensates" presented at the Mini Symposium of the North Jersey Chromatography Group Subsection of the A.C.S. on Mar. 6, 1978 at Hoffman La Roche Auditorium, Clifton N.J.

Cementitious Materials

The cementitious materials are cement slurries, mortar, grout and concrete, all of which are well-known in the art. The cements used in the preparation of the concrete mixes include Type I, II and III cements and Type H cement which is used in cement slurries for oil well cementing applications. The properties of the cements are well known and are described in the Portland Cement Association Engineering Bulletin entitled, "Design and Control of Concrete Mixtures", Twelfth Edition, 1979, and "Kirk-Othmer Encyclopedia of Chemical Technology," Second Edition (Interscience Publishers, N.Y., N.Y. 1867), Volume 4, pages 690-692. The teachings as to the properties of these cements are disclosed in these publications and are incorporated by reference herein.

These cements may be used to prepare concrete mixes containing 100 parts by weight of cement, from about 140 to about 260 parts by weight of sand, from about 100 to about 200 parts by weight of gravel and from about 35 to about 60 parts by weight of water, with the preferred concrete mixes containing 100 parts by weight of cement, from about 160 to about 230 parts by weight of sand, from about 140 to about 180 parts by weight of gravel and from about 38 to about 50 parts by weight of water. After preparation, these concrete mixes are then allowed to harden to obtain hardened concretes.

For a fuller understanding of this invention, reference may be made to the following examples. These example are given merely to illustrate the invention and are not to be construed in a limiting sense.

Examples I through XIII describe preparation of solutions of Penacolite Resin RM-441 of different pH values and concentrations, mixtures of Penacolite RM-441 and naphthalene sulfonic acid formaldehyde condensate, and various sulfonated and sulfomethylated derivatives of Penacolite Resin RM-441. For convenience, the sodium salt of naphthalene sulfonic acid formaldehyde condensate is referred to as "condensate".

EXAMPLE I

A 40% by weight aqueous solution of Penacolite Resin RM-441 was prepared by adding 200 grams of powdered resin to 200 grams of water with stirring at ambient temperatures until dissolved. The pH at this point was 7.0 and the mixture was a hazy red-orange color. The pH was adjusted to pH 10 with 21.0 grams of 30% by weight aqueous NaOH. The solution turned clear dark and was diluted with water to a total weight of 508 grams to give a 40% by weight solution.

EXAMPLE II

Penacolite Resin RM-441, 80 grams, and 120 grams of water, were mixed with stirring. The pH was adjusted to 14 by adding 87 grams of a 50% by weight aqueous solution of sodium hydroxide. The solids content was 44%. This product was readily soluble in 18% by weight brine solution.

EXAMPLE III

A mixture containing 17% by weight Penacolite Resin RM-441 and 83% by weight of the sodium salt of naphthalene sulfonic acid formaldehyde condensate was made by mixing 30 grams of a 40% by weight aqueous solution of the Penacolite Resin with 150 grams of a 40% by weight aqueous solution of condensate. The clear solution contained 40% by weight solids.

EXAMPLE IV

A mixture containing 50% by weight of Penacolite Resin RM-441 and 50% by weight of condensate was prepared at 60% by weight solids by dissolving 200.0 grams of 43% sodium salt of naphthalene sulfonic acid formaldehyde condensate, (86.0 grams dry basis) and 86.00 grams Penacolite Resin RM-441 and adjusting pH to 9.0. The highly concentrated solution was stable for extended periods without precipitation at room temperature as well as below 15° C.

EXAMPLE V

A mixture containing 25.0 percent by weight of Penacolite Resin RM-441 and 75% by weight sodium salt of naphthalene sulfonic acid formaldehyde condensate was prepared by mixing 50 grams of a 40% by weight solution of Penacolite Resin and 150 grams of a 40% by weight solution of the condensate.

EXAMPLE VI

A 50/50 weight blend of Penacolite Resin RM-441 and condensate was prepared from 100 grams of a 40% by weight aqueous solution of Penacolite Resin and 100 grams of a 40% by weight aqueous solution of condensate.

EXAMPLE VII

A 75/25 weight mixture of Penacolite Resin RM-441 and condensate were prepared from 150 grams of a 40% by weight aqueous solution of Penacolite Resin and 50 grams of a 40% by weight aqueous solution of condensate.

EXAMPLE VIII

Sulfomethylated Penacolite Resin RM-441

A three necked round bottom flask fitted with thermometer, mechanical stirrer and reflux condenser was charged with 47.0 grams of Penacolite Resin RM-441, 48.0 grams of sodium metabisulfite, 20.0 grams of 50% sodium hydroxide and 92.0 grams of water. 42.0 grams of 37% by weight aqueous solution of formaldehyde was added dropwise. The flask was then heated to 70° C. An exotherm occurred at 70°-80° C. After the exotherm subsided, the flask was heated to reflux until the percent sodium metabisulfite was 1.4% as determined by direct titration with iodine to a starch end point. The product was adjusted to 45.0% solids. The pH was 11.0.

EXAMPLE IX

Sulfonated Penacolite Resin RM-441

A three necked round bottom flask was charged with 208.0 grams of sulfuric acid (96.4%). Penacolite Resin RM-441, 93.0 grams, was added at room temperature. The reaction exothermed to 43° C. and became extremely viscous. An additional 50 grams of sulfuric acid was added and the reaction mass heated at 80° C. and sampled periodically for total acidity. The reaction was considered complete when the acidity was 10.1 meq/-grams and did not reduce upon further heating. The free sulfuric acid at this point was 36.6%. To the sulfonated mass, 393 grams of water was added and the product neutralized with 260.0 grams of 50% by weight aqueous solution of sodium hydroxide. The product was cooled to 15° C. and filtered. The filter cake, 444 grams was extracted with 50/50 volume ratio of isopropanol/water. The isopropanol was stripped leaving 444 grams containing 43.2% by weight solids. The solids contained 4.2% by weight sodium sulfate and 186 grams of organic sulfonate.

EXAMPLE X

Sulfonated Penacolite Resin RM-441 Condensed with Formaldehyde

A three neck flask was charged with 225.0 grams (0.42 moles) of the product from Example IX, 12 grams of concentrated hydrochloric acid and 21.0 grams (0.26 moles) of 37% by weight aqueous solution of formaldehyde and heated at 80° C. for about 30 hours until the product became too viscous to stir. The product was diluted with water to 33.7% by weight solids.

EXAMPLE XI

Penacolite Resin RM-441 Condensed with Formaldehyde

In a manner similar to Example X, to 200 grams of a 40% by weight aqueous solution of Penacolite Resin RM-441, adjusted with sodium hydroxide to pH 9.0, seven grams of 37% by weight aqueous solution of formaldehyde was added. The initial viscosity at 25° C. was 21 cps. (Brookfield Viscosimeter, #2 spindle, 60 RPM). The reaction mixture was heated for about 20 hours until viscosity was 180 cps and pH 9.3.

EXAMPLE XII

Penacolite Resin RM-441 Co-Condensed with Condensate

A flask was charged with 200 grams of condensate, 40 grams of Penacolite Resin RM-441, pH 9.0, 4.0 grams of 37% by weight aqueous solution of formaldehyde and heated at 100° C. for 3 hours. The product was extremely viscous and 35 grams of water was added and the product refluxed an additional 3 hours. The solids content was 31–33% by weight.

EXAMPLE XIII

Penacolite Resin RM-441 Condensed with Lignosulfonate

A flask was charged with 100 grams of 40% by weight aqueous solution of Penacolite Resin RM-441 40.0 grams of ligninsulfonate (Marasperse 22-N), 60 grams of water and 8.0 grams of 37% by weight aqueous solution of formaldehyde. The mixture was heated to reflux for 6 hours and became very viscous. The product was adjusted with 11.0 grams of water to reduce viscosity. It contained 32% by weight solids.

EXAMPLE XIV

This example describes the evaluation of 0.5% by weight of solids of the various additives based on the weight of the cement used in the mix; 0.5% by weight of solids of condensate and a control mix without additive. The additives evaluated were prepared as described in Examples I–XIII. Table I shows the mix proportions used in the mixes and is a mortar type mix found suitable for laboratory testing.

TABLE I

| Proportions Used in Mortar Type Mix | |
|---|---|
| Component | Lab Mix Weight (grams) |
| Cement - Type I | 400 |
| Sand (Fineness Modulus 7.9) | 1200 |
| Water | As indicated in Table II |

In these evaluations, water was adjusted to give constant slumps of 1¾ inches to 1⅞ inches. In this manner water reduction was more readily compared.

In the concrete batching procedure, a Hobart mixer was used. The sand was added to the mixer and water containing the additive and the cement were added simultaneously to the sand. The cement was mixed for 3 minutes, allowed to stand for 3 minutes and mixed for an additional 2 minutes. Batching was done at 70°–75° F. and at a 50% relative humidity.

Slump was measured immediately after mixing using a pipe (4¼' Ht.×3"I.D.) set in a flat plate. The pipe was filled incrementally ⅓ at a time and consolidated by rodding after each increment was added. The top was struck flat and the base cleared of extraneous cement. The pipe was then raised and the slump measured in inches as the difference between the top of the pipe and the top of the cement. The air content in the fresh cement was checked using a Chaser air indicator. Specimens used for compressive strength testing were 3×6 inches (75×150 mm) cylinders consolidated by rodding and cured at 70°–75° F., and 100% relative humidity. Data was collected after 7 days based on an average of values obtained from three cylinders following ASTM Standard C39-72.

Results of these evaluations are shown in Table II entitled, "Slump and Compressive Strength Tests". In Table II and other tables, wherever the term "Penacolite" appears, Penacolite Resin RM-441 is meant.

TABLE II

| Ex. No. | Additive | Solids (% By Wt.) | Water Used (gms) | % Water Reduction | % Air | Slump (in.) | 7-day Compressive Strength Av. of Two(psi) |
|---|---|---|---|---|---|---|---|
| — | Control (No Additive) | — | 203 | — | 3+ | 1⅞+ | 2,793 |
| — | Condensate | 43.3 | 168 | 17 | 4.5 | 1⅞ | 3,674 |
| I | Penacolite | 40 | 168 | 17 | 4.75 | 1⅞+ | 4,053 |
| III | Blend 17% Penacolite and 83% Condensate | 40 | 168 | 17 | 4.0 | 1½ | 4,014 |
| VIII | Sulfomethylated Penacolite | 43.0 | 168 | 17 | 5.25 | 1⅞+ | 4,024 |
| IX | Sulfonted Penacolite | 43.2 | 168 | 17 | 4.25 | 1½ | 3,917 |

The results in Table II demonstrate that the Penacolite Resin RM-441 is an excellent superplasticizer equivalent in performance to the sodium salt of naphthalene sulfonic acid formaldehyde condensate. The water was reduced by 17% and a slump of 1⅞+ inches was obtained with 7 day high compressive strength of 4,053 psi and good air entrainment. When mixed with condensate as in Example III, very good superplasticizer activity is similarly demonstrated. The sulfomethylated and sulfonated Penacolite derivatives show comparable activity.

EXAMPLE XIV

This example describes the evaluation of 0.5% based on the weight of cement of various blends of Penacolite Resin RM-441; 0.5% by weight mixtures of Penacolite Resin RM-441 and condensate based on the weight of cement in the concrete mix and a control concrete mix. Table III entitled, "Standard Mix Proportion Non-Air Entrained Concrete" shows the standard mix proportion used in the concrete mixes in this Example. This table is from the Portland Cement Association Engineering Bulletin entitled, "Design and Control of Concrete Mixtures", Eleventh Edition, July 1968. The standard mix proportion given in Table III was used as the control giving a reasonable workability for the tests. In the evaluation of the additives, water in the standard mix was reduced 17% to achieve a workable concrete mix. The cement used was Type I. Sand and ⅜ inches (10 mm) gravel meeting ASTM standard C33-74a were used. Except for a minor modification, the concrete batching procedure using a 2 ½ cu. ft. (0.07 m³) tilting drum mixer followed ASTM standard C192-69. This variation, which results in better reproducibility in the properties of wet concrete, involves adding the additive with the last volume of water rather than initially with the gravel.

Slump was measured according to ASTM standard C143-74. The air content in the fresh concrete was periodically checked by the pressure method (ASTM standard C 231-75); however, for convenience, the Chaser air indicator was used more frequently.

Specimens used for compressive strength testing were 3×6 inches (75×150 mm) cylinders, consolidated by rodding and cured at 70°–75° F. and at 100% relative humidity. Data were collected at 1, 7 and 28 days based on the average of values obtained for three cylinders following ASTM standard C39-72.

Results of this evaluation are shown in Table IV entitled, "Compressive Strength Tests at 17% Water Reduction".

TABLE III

Standard Mix Proportion
Non-Air Entrained Concrete
Water/Cement Ration = 0.5
Coarse Aggregate = ⅜ inch (10 mm)
Fine Aggregate = Fineness Modulus 2.9

| Component | Weight lb. | kg |
|---|---|---|
| Cement | 770 | 349.3 |
| Water | 385 | 174.6 |
| Sand | 1510 | 663.9 |
| Gravel | 1150 | 521.6 |

Table IV gives comparative data on water reduction and compressive strength and demonstrates the excellent water reduction and compressive strength of Penacolite Resin RM-441 as well and various combinations of condensate and Penacolite. The Control in Table IV was a concrete mix that contained no additive and had a water to cement ratio of 0.5 while the condensate and the blends had a water/cement ratio of 0.41–0.43, i.e., a 14%–18% water reduction over the control.

Air entrainment, expressed as percent air for all the blends, was in the proper range for good workability.

TABLE IV

Slump and Compressive Strength Tests in Concrete

| Example No. | Additive | % Water Reduction | % Air Content | Slump (in.) | Compressive Strength (psi) 24-Hrs. | 7-Days | 28-Days |
|---|---|---|---|---|---|---|---|
| | Control (No Additive) | 0.0 | 4.00 | 6.0 | 2,488 | 3,737 | 4,762 |
| | Condensate | 17.0 | 3.00 | 6.0 | 3,953 | 5,309 | 6,833 |
| I | Penacolite | 17.0 | 3.75 | 6.0 | 3,500 | 4,595 | 6,107 |
| V | Blend 25 wt. % Penacolite and 75 wt. % Condensate | 14.0 | 3.00 | 4.0 | 3,857 | 5,905 | 6,464 |
| VI | Blend 50 wt. % Penacolite and 50 wt. % Condensate | 16.0 | 3.75 | 3.0 | 3,905 | 5,845 | 7,167 |
| VII | Blend 75 wt. % Penacolite and 25 wt. % Condensate | 18.0 | 3.00 | 5.5 | 3,166 | 5,583 | 6,083 |

EXAMPLE XV

This example describes evaluation of Penacolite Resin RM-441 and sulfomethylated Penacolite Resin RM-441 to control viscosity of fresh water cement slurries for oil well cementing. The results shown in Table V indicate that sulfomethylated Penacolite of Example VIII has the same yield point as the control and can be used to control the viscosity of cement slurries. The Penacolite alone, Example II, also controls the viscosity of cement slurries but to a lesser degree.

Rheological properties of cement slurries were determined by use of the Fann V-G Meter according to API tentative procedure described on page 46, Section 10 of Supplement 1 to API RP 10B (Nineteenth Edition) Recommended Practice for Testing Oil-Well Cements and Cement Additives (issued February 1975) and is set forth below.

The Fann V-G Meter is a direct-indicating, rotational-type viscometer powered by a two-speed synchronous motor to obtain rotational speeds of 600 rpm, 300 rpm, 200 rpm, 100 rpm, 6 rpm and 3 rpm. The outer cylinder or rotor sleeve is driven at a constant rotational velocity for each rpm setting. The rotation of the rotor sleeve in the cement slurry produces a torque on the inner cylinder or bob. A torsion spring restrains the movement. A dial attached to the bob indicates displacement of the bob.

The cement slurry, prepared in accordance with Section 3 and as described below, is poured immediately into the slurry container which has been heated to 80°±5° F.

The cement slurry is stirred for a period of 20 minutes at 80°±5° F.

The slurry is transferred to sample cup (cup and bob to be at test temperature) with minimum time lag. The sample cup and slurry are maintained at the final temperature of the schedule for the duration of tests. With rotor turning at 600 rpm, the pre-heated cup containing the slurry is raised until the liquid level is at the designated line on the sleeve.

The initial reading at 600 rpm shall be taken 60 seconds after continuous rotation. Dial readings are recorded on data sheets at 600 rpm, 300 rpm, 200 rpm and 100 rpm in that order. This rotor speed shall be shifted to the succeeding lower speed at 20 second intervals. Each dial reading is taken just before shifting to the next lower speed. The plastic viscosity is obtained by determining the difference between the Fann reading at 600 rpm and 300 rpm.

The yield point or the point at which the cement flows under a force is the difference between the reading at 300 rpm and the value of the plastic viscosity.

The cement slurries were prepared according to API procedure described on pages 5 and 6, Section 3 of the API publication referred to above and is set forth below.

Type H cement, 860 grams, passed through an 850 micrometer (No. 20) sieve, was mixed with 327 grams of water and 8.6 grams of the additive to be tested at 80°±5° F. in a Waring blender at slow speed for 15 seconds and then at high speed for 35 seconds to give 600 ml of cement slurry.

which has been sulfonated, sulfomethylated, sulfonated and condensed with formaldehyde, sulfomethylated and condensed with formaldehyde, co-condensed with ligninsulfonate and formaldehyde or co-condensed with aromatic sulfonic acid formaldehyde condensate and formaldehyde and their sodium, potassium, ammonium, aluminum and zinc salts.

2. The product of claim 1 which has been sulfonated.

3. The product of claim 1 which has been sulfomethylated.

4. The product of claim 1 which has been sulfonated and condensed with formaldehyde.

5. The product of claim 1 which has been sulfomethylated and condensed with formaldehyde.

6. The product of claim 1 which has been co-condensed with ligninsulfonate and formaldehyde.

7. The product of claim 1 which has been co-condensed with naphthalenesulfonic acid formaldehyde condensate and formaldehyde.

8. An additive for cementitious materials comprising:
   (a) at least one salt of aromatic sulfonic acid formaldehyde condensate, and
   (b) at least one water soluble material selected from the group consisting of (i) residue obtained from resorcinol production by the alkaline fusion method having the following composition:
   Resorcinol: about 2 to about 8% by wt.
   Dihydroxy diphenyl: about 12 to about 20% by wt.
   Trihydroxy diphenyl: about 25 to about 35% by wt.
   Higher molecular weight polymers: balance and the sodium, potassium, ammonium, aluminum and zinc salts thereof, and (ii) derivatives of same which have been sulfonated, sulfomethylated, sulfonated and condensed with formaldehyde, sulfomethylated and condensed with formaldehyde, condensed with formaldehyde, co-condensed with ligninsulfonate and formaldehyde or co-condensed with aromatic sulfonic acid

TABLE V

| Fresh Water Sample No. | Description | Fann Viscometer Test Results in Class "H" Cement, 1% Additive | | | | | | | |
|---|---|---|---|---|---|---|---|---|---|
| | | Reading of Fann Viscometer at Various RPMs | | | | | | Rheology | |
| | | 600 | 300 | 200 | 100 | 6 | 3 | PV | YP |
| — | Condensate | 82 | 43 | 27 | 16 | 4 | 3 | 39 | 4 |
| Ex. II | Penacolite 44% Solids in water(pH-14) | 129 | 81 | 66 | 46 | 17 | 14 | 48 | 33 |
| Ex. VIII | Sulfomethylated Penacolite 43% Solids in water | 112 | 58 | 40 | 25 | 7 | 6 | 54 | 4 |

RPM = revolutions per minute
PV = plastic viscosity (cp)
YP = yield point (lb/100 ft$^2$)

While the invention has been described with reference to certain specific embodiments thereof, it is understood that it is not to be so limited since alterations and changes may be made therein which are within the full intended scope of the appended claims.

What is claimed is:

1. Water soluble residue obtained from resorcinol production by the alkaline fusion method having the following composition:
   Resorcinol: about 2 to about 8% by wt.
   Dihydroxy diphenyl: about 12 to about 20% by wt.
   Trihydroxy diphenyl: about 25 to about 35% by wt.
   Higher molecular weight polymers: balance formaldehyde condensate or formaldehyde and their sodium, potassium, ammonium, aluminum and zinc salts.

9. The additive of claim 8 wherein said component (a) is present in an amount up to about 95% by weight of component (b).

10. The additive of claim 9 wherein said component (a) is the sodium salt of naphthalenesulfonic acid formaldehyde condensate.

11. The additive of claim 9 wherein said component (b) is residue obtained from resorcinol production by the alkaline fusion method having the following composition:

Resorcinol: about 2 to about 8% by wt.
Dihydroxy diphenyl: about 12 to about 20% by wt.
Trihydroxy diphenyl: about 25 to about 35% by wt.
Higher molecular weight polymers: balance and the sodium, potassium, ammonium, aluminum and zinc salts thereof.

12. The additive of claim 11 wherein said component (b) has been sulfonated.

13. The additive of claim 11 wherein said component (b) has been sulfomethylated.

14. The additive of claim 11 wherein said component (b) has been sulfonated and condensed with formaldehyde.

15. The additive of claim 11 wherein said component (b) has been sulfomethylated and condensed with formaldehyde.

16. The additive of claim 11 wherein said component (b) has been condensed with formaldehyde.

17. The additive of claim 11 wherein said component (b) has been co-condensed with lignosulfonate and formaldehyde.

18. The additive of claim 11 wherein said component (b) has been co-condensed with naphthalenesulfonic acid formaldehyde condensate and formaldehyde.

19. A cementitious composition containing as an additive in an amount sufficient to enhance workability after water is added and to enhance compressive strength of the hardened material, at least one water soluble material selected from the group consisting of (i) residue obtained from resorcinol production by the alkaline fusion method having the following composition:

Resorcinol: about 2 to about 8% by wt.
Dihydroxy diphenyl: about 12 to about 20% by wt.
Trihydroxy diphenyl: about 25 to about 35% by wt.
Higher molecular weight polymers: balance and the sodium, potassium, ammonium, aluminum and zinc salts thereof, and (ii) derivatives of same which have been sulfonated, sulfomethylated, sulfonated and condensed with formaldehyde, sulfomethylated and condensed with formaldehyde, condensed with formaldehyde, co-condensed with ligninsulfonate and formaldehyde or co-condensed with aromatic sulfonic acid formaldehyde condensate and formaldehyde and the sodium, potassium, ammonium, aluminum and zinc salts thereof.

20. The cementitious composition of claim 19 wherein said additive is present in an amount of from about 0.1% by weight to about 5.0% by weight of the cement component.

21. The material of claim 19 wherein said cementitious composition is concrete.

22. The cementitious composition of claim 19 wherein said water soluble material is residue obtained from resorcinol production by the alkaline fusion method having the following composition:

Resorcinol: about 2 to about 8% by wt.
Dihydroxy diphenyl: about 12 to about 20% by wt.
Trihydroxy diphenyl: about 25 to about 35% by wt.
Higher molecular weight polymers: balance and the sodium, potassium, ammonium, aluminum and zinc salts thereof.

23. The cementitious composition of claim 22 wherein said water soluble material has been sulfonated.

24. The cementitious composition of claim 22 wherein said water soluble material has been sulfomethylated.

25. The cementitious composition of claim 22 wherein said water soluble material has been sulfonated and condensed with formaldehyde.

26. The cementitious composition of claim 22 wherein said water soluble material has been sulfomethylated and condensed with formaldehyde.

27. The cementitious composition of claim 22 wherein said water soluble material has been condensed with formaldehyde.

28. The cementitious composition of claim 22 wherein said water soluble material has been co-condensed with lignosulfonate and formaldehyde.

29. The cementitious composition of claim 22 wherein said water soluble material has been co-condensed with naphthalenesulfonic acid formaldehyde condensate and formaldehyde.

30. The cementitious composition of claim 19 wherein there is present (a) at least one salt of aromatic sulfonic acid formaldehyde condensate in addition to said (b) water soluble material.

31. The cementitious composition of claim 30 wherein said component (a) is present in an amount up to about 95% by weight of component (b).

32. The cementitious composition of claim 31 wherein said component (b) is residue obtained from resorcinol production by the alkaline fusion method having the following composition:

Resorcinol: about 2 to about 8% by wt.
Dihydroxy diphenyl: about 12 to about 20% by wt.
Trihydroxy diphenyl: about 25 to about 35% by wt.
Higher molecular weight polymers: balance and the sodium, potassium, ammonium, aluminum and zinc salts thereof.

33. A hardened cementitious composition characterized by enhanced compressive strength prepared from the composition of claim 19.

34. The composition of claim 33 wherein said hardened cementitious composition is concrete.

* * * * *